Figures 1, 2:
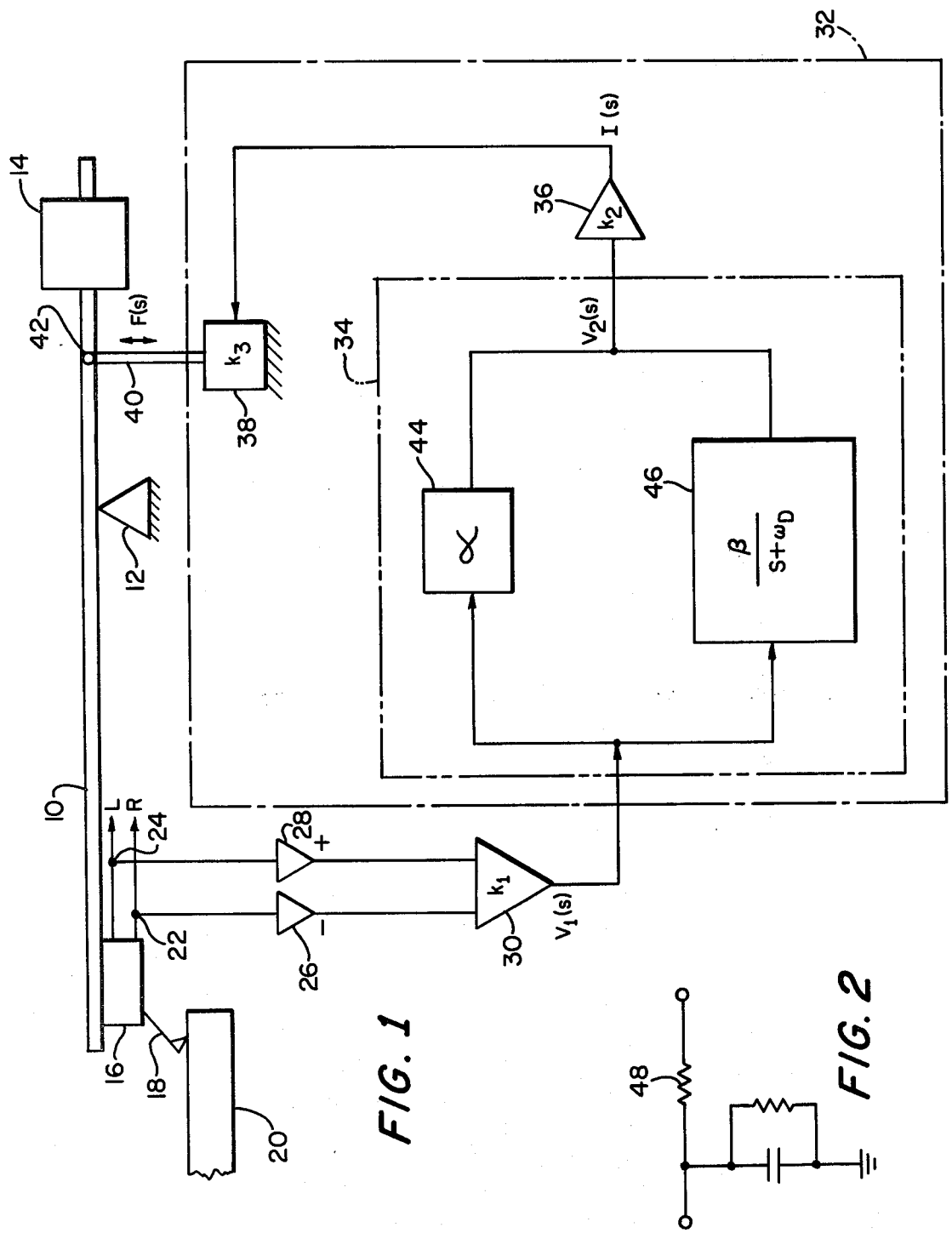

United States Patent [19]

Kates

[11] 4,434,482
[45] Feb. 28, 1984

[54] TONE ARM PICK UP SYSTEM
[75] Inventor: James M. Kates, Andover, Mass.
[73] Assignee: Teledyne Industries, Inc., Los Angeles, Calif.
[21] Appl. No.: 43,353
[22] Filed: May 29, 1979
[51] Int. Cl.³ .............................................. G11B 3/10
[52] U.S. Cl. ...................................... 369/230; 369/43
[58] Field of Search .............. 274/23 R, 1 R; 369/43, 369/215, 230

[56] References Cited

U.S. PATENT DOCUMENTS

| | | | |
|---|---|---|---|
| 3,471,655 | 10/1969 | Herre | 274/23 R |
| 3,623,734 | 11/1971 | Sakamoto | 274/23 R |
| 3,744,802 | 7/1973 | Bowerman | 274/1 R |
| 3,830,505 | 8/1974 | Rabinow | 274/1 R |
| 4,102,536 | 7/1978 | Clunis | 274/23 R |
| 4,105,961 | 8/1978 | Plummer et al. | 274/23 R |
| 4,178,489 | 12/1979 | Lippel et al. | 274/23 R |

Primary Examiner—John W. Shepperd
Attorney, Agent, or Firm—Schiller & Pandiscio

[57] ABSTRACT

A tone arm system for a high fidelity record player is provided having servo-controlled record warp compensation means. One or more feedback loops are employed to apply a variable force vertically and optionally, laterally, to the tone arm in response to the frequency of stylus vibration. The action of the feedback loop or loops is used to modify the parameters of the tone arm system to provide a predetermined resonance quality factory and a predetermined resonant frequency.

13 Claims, 2 Drawing Figures

TONE ARM PICK UP SYSTEM

BACKGROUND OF THE INVENTION

The present invention relates in general to new and improved tone arm systems for high fidelity record players and in particular to a tone arm system capable of tracking the grooves of a warped record at very low tracking force.

Proper stylus tracking is essential to the high fidelity reproduction of recorded signals in a phonographic type of record player and requires that the stylus be in contact with the walls of the record groove at all times. Modulations in the groove, such as high velocity high frequency audio signals, lead-in and lead-out transistions, record warps and low frequency audio signals having large excursions, can generate substantial upward forces. These forces are primarily reactive, corresponding to the accelerations of the stylus tip mass at high frequencies and, at low frequencies, to the effective mass of the tone arm system which includes the tone arm as well as the cartridge normally carried by the latter.

If the sum of these forces exceeds the downward-acting tracking force, mistracking will occur, i.e. the stylus will leave its groove. Any reduction of the tracking force, e.g. for the purpose of reducing wear on the record and on the stylus, will only increase the probability of mistracking unless the stylus reactive forces caused by groove modulations can also be reduced. The problem is particularly pronounced with respect to low frequency tracking behavior, e.g. the tracking on a warped record of recorded low audio frequency signals having large excursions, due to the fact that record warps usually exhibit a predominant frequency range from 0.5 to 10.0 Hz, while the audio frequency range generally begins in the vicinity of 30 Hz.

In a conventional tone arm system low frequency tracking is governed primarily by four system parameters: Stylus compliance, stylus damping, tone arm effective mass and tone arm pivot damping. The force required to track a record groove is determined by the product of the mechanical driving point impedance and the velocity of the stylus. The tracking force required in the low frequency range is determined by the product of the aforesaid impedance and the vertical stylus velocity due to record warps and low frequency audio modulation at any given frequency.

In order to reduce the wear on the record grooves and on the stylus it is desirable to maintain the tracking force as low as possible. Various solutions have been proposed in the past in an attempt to track warped records without the necessity for applying unduly large tracking forces detrimental to the record grooves and to the stylus. One such system is disclosed in U.S. Pat. No. 3,830,505, which uses either a low pass filter to separate the cartridge signals from the audio output, or a pickup device separate from the cartridge and stylus to isolate it from the audio signals. The servo feedback signal so obtained is amplified and energizes a linear magnetic motor to apply a compensating force to the tone arm intended to keep the cartridge from changing its position relative to the surface of the record.

A similar system is disclosed in U.S. Pat. No. 3,623,734 wherein servo action is again used to maintain the pickup in a position which is at a predetermined distance from the disk surface. In the system disclosed in this patent the feedback signal is modified to improve the operating characteristics of the system, e.g. to speed up the response time and thereby maintain within bounds the deviation represented by the feedback signal.

Experience has shown that the operation of a tone arm system wherein the servo action is directed to maintaining the cartridge position constant relative to the surface of the record does not provide optimum performance, particularly in the low frequency range. In such a system, record warp still produces occasional mistracking, particularly at the desired low levels of tracking force. In order to avoid the mistracking of warped records relatively high tracking forces must be used, particularly in the low audio frequency range, with the result that wear on the record and on the stylus are increased.

Record warp is rarely if ever purely radial but is instead usually skewed to some degree. Hence the force generated on the tone arm by the record warp will usually posses lateral, i.e. horizontal, as well as vertical components although the latter tend to predominante. Such lateral forces will also cause mistracking errors which are particularly undesirable in stereo recordings because in the latter, balance is very important but such lateral forces tend to be unevenly distributed on the two walls of the record groove, and impair the desired balance.

It is a primary object of the present invention to provide a tone arm system for a high fidelity record player wherein improved performance over comparable prior art systems is obtained.

It is another object of the present invention to provide an improved tone arm system wherein high-fidelity performance is obtained even at low frequencies through the use of record warp compensation which tone arm system permits the use of low tracking forces.

It is still another object of the present invention to provide a servo-controlled tone arm system wherein record warp is compensated for by the action of the feedback loop which modifies the system parameters to obtain a selected resonance quality factor and a selected resonant frequency.

It is yet another object of the present invention to provide high-fidelity reproduction of low audio frequency signals recorded on a warped record using low tracking forces, wherein servo-controlled feedback compensation is employed to modify the system parameters and provide a predetermined resonance quality factor and a resonant frequency that falls between the upper limit of the expected range of warp frequencies and the lower limit of the audio frequency range.

The resonant frequency of a tone arm system is determined by the effective mass of the system and by the compliance of the stylus. The resonance quality factor Q of the system is determined by the damping at the stylus and at the tone arm pivots.

The present invention is based on the consideration that the mechanical driving point impedance is highest at the resonant frequency of the system. The latter impedance, as well as the Q of the system, determine the force necessary for tracking in the low frequency range. Although high stylus compliance will minimize the tracking force, particularly in the low frequency audio range, any increase of stylus compliance lowers the resonant frequency of the tone arm system of which the stylus is a part. Thus, there is an increase in the force necessary to track record warps and low frequency audio modulations. The effective mass of the system acts as a limit on total system performance since it cannot be reduced below the mass of the cartridge in a conventional system. This lower limit on the mass therefore sets a maximum compliance limit of the stylus.

Accordingly, in the present invention, a pivoted tone arm system is employed which includes one or more feedback loops energized by the amplified output signal of a tone arm-mounted cartridge. Each feedback loop includes a compensation network connected to corresponding torque motor which applies a variable force in a selected direction to the tone arm to modify the normal parameters of the tone arm system. With the resonance quality factor and the system resonant frequency selectively set at predetermined values, a high compliance stylus may be used which permits the tracking force to be kept low in the warp frequency range as well as in the low audio frequency range.

The foregoing and other objects of the present invention, together with the features and advantages thereof will become apparent from the following detailed specification, when considered in conjunction with the accompanying drawings.

FIG. 1 illustrates in block diagram form a preferred embodiment of the present invention; and FIG. 2 illustrates in greater detail the compensation filter employed in the apparatus of FIG. 1.

With reference now to the drawings, FIG. 1 illustrates in block diagram form the warp-compensated tone arm system of the present invention. As shown, tone arm 10 is supported on pivot 12 and carries counterweight 14 which is disposed to one side of the pivot. Cartridge 16 is carried near the end of the tone arm on the other side of pivot 12. Stylus 18 is mounted on cartridge 16 and is adapted to engage the grooves for example, stereo record 20 positioned below the stylus. The vibrations of stylus 18 are converted into electrical signals which appear at cartridge terminals 22 and 24 for the right and left stereo channels respectively. These output signals are subsequently operated on by conventional circuitry which forms no part of the present invention.

A pair of buffer amplifiers 26 and 28 have their respective inputs connected to cartridge terminals 22 and 24 respectively. Signal amplifier 30 is connected to receive the outputs of buffer amplifiers 26 and 28, the latter serving to isolate amplifier 30 from the cartridge signal channels. The gain $k_1$ of amplifier 30 is preferably substantially constant in the frequency range under consideration, such that the amplifier output signal $V_1(s)$ is proportional for example to the vertical velocity of stylus 18 relative to tone arm 10.

The output of amplifier 30 is connected to feedback path 32 which includes means in the form of compensation filter 34, for generating an output signal dependent upon the frequency of the signal representative of vertical stylus motion, and means for applying a vertical force to the tone arm to modify the effective mass of the latter as a function of the frequency dependent output signal from filter 34. The last-mentioned means comprise power amplifier 36 and linear torque motor 38. The output of amplifier 30, i.e. the source of vertical velocity signal $V_1(s)$, is coupled to the input of compensation filter 34. The latter has a transfer function $G(s)$ such as to provide an output signal $V_2(s)$ for input signal $V_1(s)$.

The compensation filter is seen to comprise first and second circuit branches 44 and 46 respectively, connected in parallel to provide the equivalent transfer function of a lag network. Using conventional Laplace transform symbolism, the latter is given by:

$$G(s) = \frac{V_2(s)}{V_1(s)} = \frac{s + \left(\omega_D + \frac{\beta}{\alpha}\right)}{s + \omega_D}$$

where $\omega_D$ designates the lower limit of the frequency range in which the compensation filter is effective $\alpha$ designates the substantially pure amplification gain of branch 44;

$\beta$ designates the gain of branch 46, which constitutes essentially an imperfect integrator having a transfer function $\beta/(s+\omega_D)$.

The source of signal $V_2(s)$ is coupled to the input of power amplifier 36 which has a substantially constant gain $k_2$ so as to provide an output current $I(s)$ proportional to the signal $V_2(s)$. The output of amplifier 36 is coupled to the input of motor 38. The latter has a constant gain $k_3$ adapted to provide a proportional force $F(s)$ at its output shaft 40. The latter is coupled to point 42 on tone arm 10, intermediate the pivot 12 and counterweight 14.

FIG. 2 illustrates an exemplary "leaky" or imperfect integrator of the type usable to provide branch 46 in compensation filter 34 in FIG. 1. A pure integration function is provided by resistor 48 and capacitor 50, while resistor 52 represents the leakage path around the capacitor. It will be understood that this type of imperfect integrator may be implemented in a number of different variations and it is in fact embodied in most integratoring networks due to the leakage of most capacitors employed. Branch 44 is in the equivalent of any simple amplifier.

In operation, the vertical velocity signal $V_1(s)$ is applied to compensation filter 34, which in turn applies a frequency-dependent output signal $V_2(s)$ to power amplifier 36. The output current $I(s)$ of the latter is applied to torque motor 38 which applies a responsive force $F(s)$ to point 42 on tone arm 10 proportional to the signal $I(s)$.

The force applied to tone arm 10, (which may be positive or negative), modifies the effective mass of the tone arm system. Depending on the system parameters employed, the compliance of the stylus is kept low to permit the use of the lowest possible tracking force. In the latter case, the servo control applied by the feedback loop 32 may provide a negative effective system mass.

Because the gains of power amplifier 36 and torque motor 38 are constant, the overall transfer function $H(s)$ of feedback path 32 is specified within a constant $(k_2k_3)$ in terms of $G(s)$.

If $\omega_D$ is assumed to be low, $H(s) \approx \alpha + (\beta/s)$. It will be noted that varying the $\beta$ term in branch 46 thus controls the resonant frequency of the total tone arm system, while varying the $\alpha$ term controls the quality resonance factor Q of the system. These values are separately adjustable to provide maximum flexibility. In accordance with the present invention, optimum performance is obtained by selecting $\beta$ to obtain a resonant frequency in the range from about 10 Hz to about 25 Hz and preferably at about 15 Hz and adjusting $\alpha$ to let Q equal a value in the range of about 2 to about 3.5 and preferably at about 3. It will be noted that the optimized resonant frequency so selected falls above the normal range of expected warp frequencies extending approximately from 0.5 to 10 Hz and below the lower limit of the audio frequency range which starts at approximately 30 Hz.

Thus, while prior art tone arm systems effect a modification of the system parameters incidental to maintaining the cartridge position constant relative to the surface of the record, the present invention is directed to modifying the effective system mass for the purpose of obtaining a desired system resonance quality factor and a system resonant frequency that falls between the upper limit of the expect warp frequency range and the lower limit of the audio frequency range, both quantities being separately adjustable. As a consequence, the high tracking forces that are required in prior art systems are avoided in the present invention in the warp frequency range as well as in the low audio frequency range. Therefore, the invention permits the use of a stylus with high compliance so that wear on the record and on the stylus are minimized.

Where it is desired to provide compensation for lateral, i.e. horizontal components of force generated by record warp, as well as for the vertical component as previously described, one need only provide a like duplicate system wherein however a filter is provided for generating an output signal dependent on the frequency representative of horizontal stylus motion above the normal stylus motion due to tracking and below the expected minimum acoustic frquency recorded on the record. The frequency dependent output of the filter is, as previously applied through a power amplifier to a torque motor which however is coupled to apply the requisite horizontal force to the tone arm.

It will be clear that the present invention lends itself to a number of modifications without departing from the basic principles thereof. For example, depending on the requirements of the particular tone arm system, torque motor 38 may be coupled to the tone arm at various points along the length thereof relative to the pivot 12 and the counterweight 14. The pivot schematically illustrated at 12 in FIG. 1, may take a number of different forms, including a gimbaling arrangement. Similarly, torque motor 38 may be implemented in various ways, provided only that the linear force derived at the output is proportional to the input signal.

Compensation network 34 may be modified to fit the particular requirements of different situations, provided that the tone arm system parameters are modified such that the desired system Q is obtained and further provided that the system resonant frequency falls between the lower limit of the audio frequency range and the upper limit of the expected warp frequency range. In this context, while the amplification factors $k_1$, $k_2$ and $k_3$ have been treated as pure gain constants for purposes of illustration, this is not necessarily the case in all practical situations. Accordingly, the transfer function $G(s)$ of the compensation network must accommodate to these variations.

From the foregoing discussion it will be apparent that numerous modifications, substitutions and changes will now occur to those skilled in the art, all of which fall within the spirit and scope of the present invention, as defined by the appended claims.

What is claimed is:

1. In a warp-compensating system for use in a record player, which system comprises a pivotable tone arm carrying a stylus of predetermined compliance adapted to track the grooves of a record, and means responsive to the velocity of said stylus relative to said tone arm to provide a corresponding velocity signal, the improvement comprising a compensation network for generating an output signal responsively to said velocity signal, and torque means coupled to said tone arm and responsive to said output signal for varying the tracking force applied to said record by said stylus, said network and torque means being selected such that said output signal and the response of said torque means to said output signal modify at least the effective mass of said tone arm and stylus to provide to said tone arm and stylus a predetermined resonance quality factor and a resonant frequency between the upper limit of the normal record warp frequency range and at least the normal lower limit of the audio frequency range for such records.

2. The system of claim 1 wherein said torque means and said network are adjustable to vary said resonance quality factor and said resonant frequency independently of each other.

3. The system of claim 1 and further including power amplification means connected between said compensation network and said torque means for amplifying said output signal, said torque means being adapted to apply a force to said tone arm proportional to the amplified output signal provided by said power amplification means.

4. The system of claim 1 wherein said compensation network is selected in view of the existing system parameters to provide said resonance quality factor at a value substantially in the range of 2 to 3.5 and said resonant frequency substantially in the range of 10Hz to 25Hz.

5. The system of claim 1 wherein said compensation network is selected in view of the existing system parameters to provide said resonance quality factor at a value of approximately 3 and said resonant frequency at a value of approximately 15Hz.

6. The system of claim 1 wherein said compensation network is selected to provide the equivalent transfer function of a lag network of the type having first and second branches connected in parallel, where said first branch has substantially only amplification gain and said second branch has substantially the gain of an imperfect integrator.

7. The system of claim 6 wherein said transfer function is determined by $$\frac{V_o(s)}{V_i(s)} = \frac{s + \left(\omega_D + \frac{\beta}{\alpha}\right)}{s + \omega_D}$$

where:
 $V_i$ designates said velocity signal;
 $V_o$ designates said output signal;
 $\alpha$ designates the gain of said first branch;
 $\beta$ designates the gain of said second branch; and
 $\omega_D$ designates the lower limit of the frequency range within which said compensation network is substantially effective;
and wherein the values of $\alpha$ and $\beta$ are separately adjustable to provide selective, independent variation of said resonance quality factor and of said resonant frequency respectively.

8. The system of claim 1 wherein said torque means is coupled to said tone arm to apply said force on one side of the tone arm pivot;

said means for providing said velocity signal including a cartridge disposed on said tone arm on the other side of said pivot and having said stylus mounted thereon, and means for amplifying said velocity signal.

9. The system of claim 8 and further including a counterweight disposed on said tone arm on said one side of said pivot.

10. In a tone arm system for a record player of the type having a pivoted tone arm terminating in a cartridge-mounted stylus adapted to track the grooves of a record and further including means for providing an amplified cartridge signal representative of the vibrations of said stylus, the normal parameters of said system providing respectively a resonance quality factor substantially determined by the damping at said stylus and at the tone arm pivot and a resonant frequency substantially determined by the compliance of said stylus and by the effective sytem mass:

a servo feeedback loop adapted to compensate for record warp, said feedback loop being connected to receive said amplified cartridge signal and being selectively adapted to modify said resonance quality factor and said resonant frequency respectively; said feedback loop comprising:

a compensation filter having the equivalent transfer function of a lag network of the type wherein a first network branch provides substantially pure amplification gain and a second branch connected in parallel with said first branch has substantially the gain of an imperfect integrator;

power amplification means connected to the output of said filter; and torque motor means responsive to the output of said power amplification means and adapted to apply a proportional force to said tone arm;

the gain of said first branch determining for said system a pre-established system resonance quality factor and the gain of said second branch determining for said system a system resonant frequency between the upper limit of the expected warp-originated frequency range and at least the lower limit of the normal audio frequency range for said records.

11. The apparatus of claim 10 wherein said gains provide a system resonance quality factor having a value in the vicinity of 3 and a system resonant frequency in the vicinity of 15 Hz.

12. The apparatus of claim 10 wherein said compensation filter is adapted to vary said gains independently of each other.

13. In a tone arm system including a tone arm supported on a pivot positioned intermediate the ends of said tone arm, a cartridge positioned on said tone arm to one side of said pivot, a stylus of predetermined compliance carried by said cartridge and adapted to engage the grooves of a record, and means for deriving a signal from said cartridge proportional to the velocity of said stylus relative to said tone arm;

the improvement comprising:

means for compensating for the effect of record warp including:

means for amplifying said velocity signal;

a feedback path including a compensation network connected to receive the amplified velocity signal;

power amplifying means connected to the output of said compensation network to provide a responsive output current;

a torque motor connected to the output of said power amplifying means and coupled to said tone arm for applying a vertical force to said tone arm proportional to said output current;

said compensation network having the equivalent transfer function of a lag network of the type wherein a first branch provides substantially pure gain and a second branch connected in parallel with said first branch provides substantially the gain of in imperfect integrator; said transfer function being defined by $$\frac{V_o(s)}{V_i(s)} = \frac{s + \left(\omega_D + \frac{\beta}{\alpha}\right)}{s + \omega_D}$$

where:

$V_i$ designates the input signal to said network;

$V_o$ designates the output signal from said network;

$\alpha$ designates the gain of said first branch;

$\beta$ designates the gain of said second branch; and $\omega_D$ designates the lowest frequency at which said compensation network becomes substantially effective;

the values of $\alpha$ and $\beta$ respectively, being independently adjustable to provide for said system a resonance quality factor having a value in the vicinity of 3 and a resonant frequency in the vicinity of 15 Hz, said resonant frequency being selected to fall between the expected upper limit of the warp frequency range and at least the lower limit of the audio frequency range recorded on said record.

* * * * *